United States Patent [19]

Muraoka

[11] Patent Number: 4,987,557
[45] Date of Patent: Jan. 22, 1991

[54] SYSTEM FOR CALCULATION OF SUM OF PRODUCTS BY REPETITIVE INPUT OF DATA

[75] Inventor: Yutaka Muraoka, Oshino, Japan

[73] Assignee: Fanuc Ltd., Minamitsuru, Japan

[21] Appl. No.: 314,055

[22] PCT Filed: Jun. 25, 1988

[86] PCT No.: PCT/JP88/00636
§ 371 Date: Feb. 9, 1989
§ 102(e) Date: Feb. 9, 1989

[87] PCT Pub. No.: WO88/10473
PCT Pub. Date: Dec. 29, 1988

[30] Foreign Application Priority Data
Jun. 25, 1987 [JP] Japan .................. 62-156427

[51] Int. Cl.$^5$ .................. G06F 7/00; G06F 15/00
[52] U.S. Cl. ........................................ 364/750.5
[58] Field of Search ............................. 364/750.5

[56] References Cited

U.S. PATENT DOCUMENTS 3,961,167  6/1976  Mills .................... 364/750.5
4,489,393 12/1984  Kawahara et al. .............. 364/750.5
4,550,437 10/1985  Kobayashi et al. ................ 364/200

FOREIGN PATENT DOCUMENTS 58-1275 1/1983 Japan.

Primary Examiner—Dale M. Shaw
Attorney, Agent, or Firm—Staas & Halsey

[57] ABSTRACT

A system for calculation of a sum of products is provided in which an inexpensive sum-of-products arithmetic unit is utilized. When n/d processors of a processor array (2) are input with individual data items in a data sequence from a memory (1), the data items are multiplied by set coefficients of n coefficients. An output equal to the sum of the products obtained is added by an adder (3) to a stored value which is read from a corresponding address of an intermediate storage unit (4), and the sum obtained is stored in the intermediate storage unit. The input data is then shifted, and the process described above is again executed. When the process is completed for all the data sequence in the memory (1), the above-described operation is again performed, with the reading of data from the intermediate storage (4) and writing of the output of the adder delayed by n/d cycles and with other coefficients of the n coefficients being set. Such processing of the same data sequence by the processor array (2) is repeated d times, to obtain a desired sum of products.

7 Claims, 1 Drawing Sheet

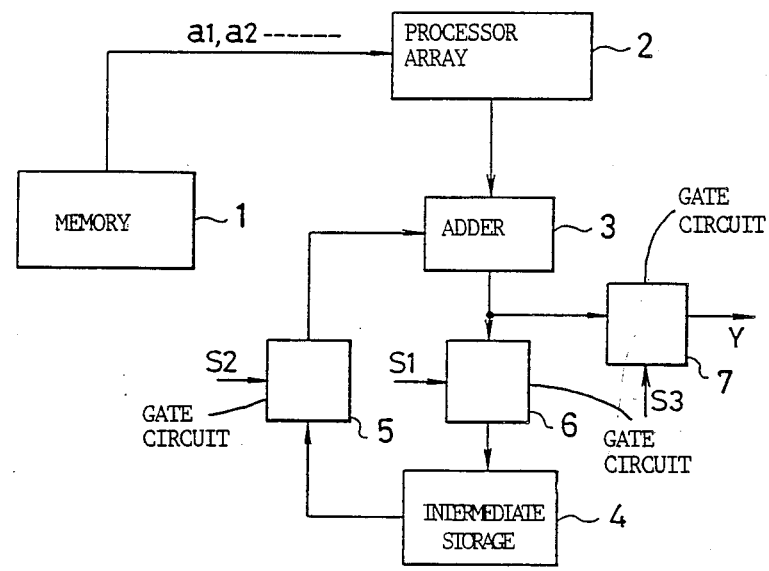

SYSTEM FOR CALCULATION OF SUM OF PRODUCTS BY REPETITIVE INPUT OF DATA

BACKGROUND OF THE INVENTION (a) Field of the Invention

The present invention relates to a system for calculation of a sum of products in which data items of a time- or space-based array such as image data are multiplied individually by coefficients corresponding to a distribution curve and then the products obtained are added together.

(b) Description of the Related Art

There exists several known systems for calculation of a sum of products, such as a convolution integrator used for enhancement of the sharpness of image data, spatial filtering and the like, wherein n data items are sequentially fetched from a time-or space-based array of data and are multiplied individually by coefficients corresponding to a distribution curve. The n data multiplied by the coefficients are then added to output the sum. In such a system, the products of the n data items and the respective coefficients are obtained at one time, then added together, and finally the sum of the products is output. Subsequently, the data items are shifted, so that the shifted n data items can be multiplied by the corresponding coefficients. The obtained products are added together, and the sum is output. The operation described is executed successively. In this case, the n data items need to be multiplied at one time by their corresponding coefficients. To this end, an arithmetic unit for the sum-of-products operation of a systolic array type is used having n processors which are arranged in parallel for multiplication.

Assuming that n data items are fetched sequentially from a sequence of data $a_1, a, a_3, \ldots a_m, \ldots$ and are multiplied at one time by coefficients $k_1$ to $k_n$, respectively, the products obtained are added together, and the sum is delivered as output Y. In this case, the output Y of the arithmetic unit for sum-of-products operation is as follows:

Output Y1 obtained first is $$Y1 = k_1a_1 + k_2a_2 + k_3a_3 \ldots k_{na} \quad (1)$$

Second output Y2 produced next is $$Y2 = k_1a_2 + k_2a_3 + k_3a_4 \ldots k_na_{n+1} \quad (2)$$

and i-th output Yi is $$Yi = k_1a_i + k_2a_{i+1} + k_3a_{i+3} \ldots k_na_{n+i-1} \quad (3)$$

Since the products of the n data items and their respective coefficients must be obtained at the same time, a systolic array is employed in which n processors serving as multipliers are connected in parallel.

The processors which are used as multipliers are required to perform at high-speed and are therefore expensive. Consequently, there is a problem in that if the number of coefficients to be multiplied is large, the arithmetic unit required for sum-of-products operation becomes very expensive.

SUMMARY OF THE INVENTION

It is therefore an object of the present invention to provide a system for calculation of a sum of products in which the number of the processors used as multipliers is reduced. Accordingly, the system provides an inexpensive arithmetic unit for the sum-of-products operation.

To achieve the above object, the present invention provides a system for calculation of the sum of products in which n coefficients are multiplied by corresponding data items and the products obtained are then added together. The system comprises a processor array including n/d processors to which data items of a data sequence are input while being shifted. The processors multiply the input data items individually by the coefficients. The processor array adds together the outputs of the processors and outputs the sum obtained; an adder for adding the output of the processor array to a value stored in an intermediate storage unit which corresponds to a respective shift; and the intermediate storage unit stores the output of the adder in an address thereof corresponding to a respective shift. The same data sequence is input to the processor array d times, and the coefficients set in the processors are varied to respective predetermined values each time the data sequence is input. The reading of data from the intermediate storage unit and the writing of the output supplied from the adder being delayed by n/d cycles each time the data sequence is input. The output of the adder is then the result of addition of the products of the n coefficients and the data items.

Assuming that the sequence of data to be processed is $a_1, a_2, a_3, \ldots$, and that the number of processors in the processor array is n/d=m. According to the present invention, first, coefficients $k_1, k_2, \ldots k_m$ are set in respective processors, and the data sequence is input (hereinafter the term "pass" is used to indicate inputting of the data sequence $a_1, a_2, a_3, \ldots$ to all the processors). The output $P_{1-1}$ of the aforementioned adder in the first cycle is as follows. (Meanwhile, the values stored at the individual addresses of the intermediate storage unit have been cleared to "zero" by initialization.)

$$P_{1-1} = k_1a_1 + k_2a_2 + \ldots + k_ma_m$$

The output $P_{1-1}$ is stored in the intermediate storage unit at a corresponding address A1. In the subsequent cycle after a shift of the input data, the adder delivers the output $P_{1-2}$:

$$P_{1-2} = k_1a_2 + k_2a_3 + \ldots + k_ma_{m+1}.$$

This output is stored in a corresponding address A2 of the intermediate storage unit. This operation is repeated thereafter and, in the i-th cycle, the adder produces the output $P_{1-i}$:

$$P_{1-i} = k_1a_i + k_2a_{i+1} + \ldots + k_ma_{i+m-1}.$$

The output $P_{1-i}$ is stored in the intermediate storage at the address Ai.

Upon completion of all the necessary shifts of the data sequence $a_1, a_2, \ldots$ which is to be subjected to the sum-of-products operation, coefficients $k_{m+1}$ to $k_{2m}$ corresponding processors of the processor array. The data sequence $a_1, a_2, \ldots$ is again input to the processor array so that the above-described operation is executed. In this second pass, the reading and writing of data from and into the intermediate storage unit is delayed by m cycles. That is, from the (m+1)th shift, data starts to be read from the intermediate storage, sequentially from the address A1. The data read from the address A1 is added to the value output from the processor array at the time of the (m+1)th shift. The sum obtained is then sequentially stored in the intermediate storage unit beginning at the address A1.

More specifically, in the second pass, output $P_{2-1}$ of the adder in the (m+1)th shift is $$P_{2-1} = P_{1-1} + k_{m+1}a_{m+1} + k_{m+2}a_{m+2} + \ldots k_{2m}a_{2m}$$
$$= k_1a_1 + k_2a_2 + \ldots + k_{2m}a_{2m}.$$

The output in the next cycle is $$P_{2-2} = P_{1-2} + k_{m+1}a_{m+2} + k_{m+2}a_{m+3} + \ldots k_{2m}a_{2m+1}$$
$$= k_1a_2 + k_2a_3 + \ldots + k_{2m}a_{2m+1},$$

and the output obtained in the i-th cycle is $$P_{2-i} = P_{1-i} + k_{m+1}a_{m+i} + k_{m+2}a_{m+i+1} \ldots + k_{2m}a_{2m+i-1}$$
$$= k_1a_1 + k_2a_{i+1} + \ldots + k_{2m}a_{2m+i-1}.$$

These outputs $P_{2-2} \ldots P_{2-i}$ of the adder are respectively stored at the addresses A2 through Ai of the intermediate storage unit.

The above-described operation is repeated thereafter and, at the time of the last data input, i.e., in the d-th pass, coefficients $k_{n-m+1}$, $k_{n-m+1} \ldots k_n$ are set in the respective processors of the processor array (since d·m=n, m coefficients are set in one pass, and accordingly in the d-th pass, coefficient $k_{dm}=k_n$ is set in the last processor of the processor array). In this case, the reading and writing of data for the intermediate storage unit is delayed by (d−1)m cycles. Thus, it is from the (d−1)m+1 shift that data starts to be read from the intermediate storage unit, sequentially from the address A1. The data read is added to the output of the processor array. The sum is output from the adder as output Y. Accordingly, the output Y1 obtained first is $$Y1 = P_{d-1} = P_{(d-1)-1} + k_{n-m+1}a_{(d-1)m+1} + \qquad (4)$$
$$k_{n-m+2}a_{(d-m)+2} \ldots k_n a_{(d-1)m+m}$$
$$= k_1a_1 + k_2a_2 \ldots + k_{(d-1)m}a_{(d-1)m} + $$
$$k_{n-m}a_{(d-1)m+1} \ldots + k_n a_{(d-1)m+m}$$
$$= k_1a_1 + k_2a_2 + \ldots k_{n-m}a_{n-m} + $$
$$k_{n-m+1}a_{n-m+1} \ldots + k_n a_n$$
$$= k_1a_1 + k_2a_2 + \ldots + k_n a_n.$$

Output Yi obtained in the i-th cycle is given in the following equation (5):

$$Yi = P_{d-i} = P_{(d-1)-i} + k_{n-m+1}a_{(d-1)m+i} + \qquad (5)$$
$$K_{n-m+2}a_{(d-1)m+i+1} + \ldots k_n a_{(d-1)m+m+i-1}$$
$$= k_1a_i + k_2a_{i+1} \ldots k_n a_{n+i-1}.$$

The above equations (4) and (5) are This means that a sum-of-products operation was performed by multiplying n data items fetched sequentially from the data sequence by the coefficients $k_1$ to $k_n$, respectively, while shifting the data items, and by summing the products obtained.

As described, according to the present invention, a sum-of-products operation can be performed with processors whose number is smaller than the number of data items to be subjected to sum-of-products operation (the number of the processors is a measure of the number of the data items). Thus, the processors used for multiplication, which are costly, can be reduced in number, and sum-of-products operations can be executed with an inexpensive unit.

BRIEF DESCRIPTION OF THE DRAWINGS

FIG. 1 is a block diagram illustrating a principal part of an apparatus to which a sum-of-products calculation system is applied according to an embodiment of the present invention.

DESCRIPTION OF THE PREFERRED EMBODIMENTS

In the accompanying drawing, reference number 1 denotes a memory, such as a dynamic RAM or the like, which stores a time- or space-based array of data to be processed, such as image data. In the case of image data, for example, 256 memory cells each for storing 8-bit data corresponding to one picture element are assigned for one scanning of an object by a CCD camera or the like, and 256×256 memory cells in total are provided for 256 scannings. Designated at 2 is a processor array which includes a plurality of processors serving as multipliers for multiplying items from memory 1 individually by coefficients corresponding to a distribution curve. The processor array 2 comprises, in addition to the processors, shift registers for sequentially shifting data to be processed, a coefficient memory area for storing the coefficients, coefficient switching means for switching the coefficients, and an adder for summing up the outputs of the processors (i.e., the products of the data items and the coefficients). Reference numeral 3 designates an adder for adding the output of the processor array 2 (i.e., the sum of the products of the data items and the coefficients) to the data stored in an intermediate storage unit 4.

The intermediate storage unit 4 serves to temporarily store data which is obtained during intermediate processing prior to output of the result Y of a sum-of-products operation. Reference numerals 5, 6 and 7 denote gate circuits. The processing of the present invention includes inputting data to the processor array 2 from the memory 1; shifting, multiplying, and adding the data; switching of the coefficients in the processor array 2; controlling the gate circuits 5, 6 and 7; and controlling the writing and reading to and from the intermediate storage unit 4. Such processing is executed by a control apparatus, not shown, in accordance with a microprogram.

A sum-of-products operation is performed on a sequence of data items. For example, in the case of the image data mentioned above, a data sequence $a_1, a_2, \ldots$ corresponding to 256 picture elements for one scanning, the sum-of-products operation is performed by multiplying n data items individually by coefficients $k_1$ to $k_n$ corresponding to a distribution curve while shifting the data sequence and by summing up the products obtained to produce the output Y, as shown in equations (3) and (5).

$$Yi = k_1a_i + k_2a_{i+1} + \ldots k_n a_{n+i-1}$$

$$(i=1, 2, 3, \ldots)$$

According to the present invention, the number m of the processors used for multiplication is set to n/d (where d is a measure of n) and the data sequence is passed (input) d times. In this embodiment, explanation is given on the assumptions that n=4, d=2, and m=4/2=2. Accordingly, the number m of the processors in the processor array 2 is equal to 2. Four data items $a_i$, $a_{i+1}$, $a_{i+2}$, $a_{i+e}$ (i=1, 2, 3,...) are multiplied individually by coefficients $k_1$, $k_2$, $k_3$ and $k_4$, and the products obtained are added together, thereby performing the sum-of-products operation as shown in equation (6).

$$Y_i = k_1 a_i + k_2 a_{i+1} + k_3 a_{i+2} + k_4 a_{i+3} \qquad (6)$$

First, the coefficient $k_1$ and $k_2$ are set respectively in the two processors of the processor array 2, and the data sequence $a_1$, $a_2$, ..., which is to be subjected to a sum-of-products operation, is sequentially input to the processor array 2 from the memory 1 while being shifted. In the case where data of 256 picture elements $a_1$-$a_{256}$ is input to the processor array, for example, first, data items $a_1$ and $a_2$ are input to the two processors of the processor array 2 to be multiplied by the coefficients $k_1$ and $k_2$ respectively set in the processors. The obtained products $k_1 a_1$ and $k_2 a_2$ are added together and output. The output $k_1 a_1 + k_2 a_2$ is applied to the adder 3, to be added to the data from the intermediate storage unit 4. In the first pass, however, the gate circuits 5 and 7 are closed, and only the gate circuit 6 is opened by application of a signal S1 from the control apparatus of a microprogram control unit. As a result, the adder 3 delivers the output $k_1 a_1 + k_2 a_2$ of the processor array 2 as its output $P_{1-1}$.

$$P_{1-1} = k_1 a_1 + k_2 a_2 \qquad (7)$$

The output $P_{1-i}$ is delivered, through the gate 4 circuit 6, to the intermediate storage unit 4 and written in the address A1.

Next, the data is shifted so that data items $a_2$ and $a_3$ are input to the respective processors of the processor array 2 and multiplied by the coefficients $k_1$ and $k_2$, respectively. The products obtained are added together, and the sum is output from the processor array 2. Since at this time the adder 3 has no data input from the intermediate storage unit 4, it delivers output $P_{1-i}2$, shown in equation (8), which is stored at the address A2 of the intermediate storage unit 4.

$$P_{1-2} = k_1 a_2 + k_2 a_3 \qquad (8)$$

In this manner, the data items a1, a2, ... are multiplied sequentially by the coefficients $k_1$ and $k_2$ as the data items are shifted. The sum of the two products is then stored in the corresponding address of the intermediate storage unit 4. Consequently, in the i-th cycle, the output $P_{1-i}$ of the adder 3 is $$P_{1-i} = k_1 a_i + k_2 a_{i+1} \qquad (9).$$

This output is stored at the address Ai of the intermediate storage unit 4.

When all the data items to be subjected to sum-of-products operation are passed once to the processor array, for example, when image data corresponding to all of the 256 picture elements is passed, the calculated values $P_{1-1}$ to $P_{1-256}$, obtained by the sum-of-products operations of the first pass, are stored respectively in the addresses A1 to A256 of the intermediate storage unit 4. (In practice, the calculated value $P_{1-256}$ is not stored because doing so is meaningless.)

Subsequently, coefficients $k_3$ and $k_4$ are set in the respective processors of the processor array 2. The same data sequence is then passed to the processor array 2 again. In this case, the output of the processor array 2 in the first cycle is $k_3 a_1 + k_4 a_2$, which is input to the adder 3. At this time, all the gate circuits are closed so that the output $P_{2-1} = k_3 a_1 + k_4 a_2$ of the adder 3 is neither input to the intermediate storage unit 4 nor delivered as the output Y. Then, the data is shifted and, also in this cycle, the output $P_{2-2} = k_3 a_2 + k_4 a_3$ of the adder 3 is not input to the intermediate storage unit 4 or delivered as the output Y. From the third cycle, which is delayed by two cycles (i.e., from the cycle delayed by the number of cycles equal to the number (m=2) of the processors in the processor array 2), the control apparatus delivers signals S2 and S3 to open the gate circuits 5 and 6. Consequently, in this third cycle, the data $P_{1-1} = k_1 a_1 + k_2 a_2$ is stored in the address A1 of the intermediate storage unit 4, shown in equation (7), is applied to the adder 3.

As a result, the adder 3 adds the sum of products, $k_3 a_3 + k_4 a_4$, output from the processor array 2, to the value $P_{1-1}$ which is obtained by the sum-of-products operation performed in the first cycle of the first pass. The resulting sum is delivered as the output Y1 through the gate circuit 7.

$$Y1 = P_{2-1} = P_{1-1} + k_3 a_3 + k_4 a_4 \qquad (10)$$
$$= k_1 a_1 + k_2 a_2 + k_3 a_3 + k_4 a_4$$

In the next cycle, the output $k_3 a_4 + k_4 a_5$ of the processor array 2 is added to the data $P_{1-2}$ stored in the address A2 of the intermediate storage unit 4, and the sum is delivered as output Y2.

$$Y2 = P_{2-2} = P_{1-2} + k_3 a_4 + k_4 a_5 \qquad (11)$$
$$= k_1 a_2 + k_2 a_3 + k_3 a_4 + k_4 a_5$$

Similarly, in the i-th cycle, the output $k_3 a_{i+2} + k_4 a_{i+3}$ of the processor array 2 is added to the data $P_{1-i}$ stored in the address Ai of the intermediate storage unit 4. The resulting sum is delivered as output Yi.

$$Y_i = P_{2-i} = P_{1-i} + k_3 a_{i+2} + k_4 a_{i+3} \qquad (12)$$
$$= k_1 a_i + k_2 a_{i+1} + k_3 + a_{i+2} + k_4 a_{i+3}$$

$(i = 1, 2, ...)$

It is noted that equation (12) is equivalent to equation (6). This indicates that the four data items $a_i$, $a_{i+1}$, $a_{i+2}$ and $a_{i+3}$ are respectively multiplied by the coefficients $k_1$, $k_2$, $k_3$ and $k_4$ (i=1, 2, ..., and in the case of the above-mentioned image data corresponding to 256 picture elements, i=1, ... 253, since Y254 to Y256 are meaningless) and the resulting sum of the products is output in each cycle.

The foregoing embodiment was explained on the assumption that the number n of data items to be subjected to sum-of-products operation is 4, the number m of the processors is 2, and the number d of times the data sequence is passed is 2. Now, assume that the number n of the data items is 6, the number n of the processors is 2, and that the number of times d for passing the data sequence is 3. In this case, during the first pass of the data sequence, the sums of products, which are obtained by the processor array 2 and the adder 3, are stored in the intermediate storage sequentially from the address A1. Then, in the second pass, the gate circuits 5 and 6 are opened from the third cycle, which is delayed by the number of cycles equal to the number of the processors (i.e., m=2) Therefore, in the third cycle, the adder 3 adds the output of the processor array 2 to the data read from the address A1, and the sum obtained is stored in the same address A1. In the following cycles, the data stored in the intermediate storage unit 4 is sequentially read out in order beginning with the address A2 and added to the corresponding output from the processor array 2. The resulting output of the adder 3 is stored in the corresponding address from which data has just been read out. In the third pass of data sequence, the gate circuits 5 and 7 are opened from the cycle which is further delayed by two cycles, i.e., from the fifth cycle delayed by m×2=2×2=4 cycles. Hence, the stored data is read sequentially from the address A1 and added by the adder 3 to the output from the processor array 2 for each subsequent data shift. In this manner, the output Y is delivered sequentially.

As will be noted, the number n of data items to be subjected to the sum-of-products operation is divided by the number n of processors provided in the processor array 2, and the data sequence is passed n/m=d times. In the first pass of the data sequence, the sum of the products of the data from the processors of the processor array 2 and the respective coefficients are stored in the corresponding address of the intermediate storage unit 4. In the second pass, the reading and writing of data from and to the address A1 of the intermediate storage unit 4 are delayed by the number of cycles equal to the number n of the processors. The output of the processor array 2 is added to the data read from the intermediate storage unit 4, and the resulting sum is stored in the intermediate storage unit 4 sequentially from the address A1. In the subsequent passes, the reading and writing of the data from and to the address A1 of the intermediate storage 4 are further delayed by the number of cycles equal to the number of the processors. In the last pass, the output of the adder 3 is output through the gate circuit 7 as the sum-of-products output Y.

Thus, although the process time is d times longer than that of a sum-of-products calculation system including processors whose number is equal to the number n of data items, the present invention enables the reduction in the number of processors required, which are expensive, to n/d.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

I claim:

1. A system for calculation of a sum of products in which n coefficients are multiplied by data items to obtain products, the products are added together to produce outputs, said system comprising:

a processor array means, having n/d processors, for receiving and shifting the data items of a data sequence to produce input data items and for multiplying the input data items individually by n/d of the n coefficients, said processor array adds together products of said processors and outputs the sum obtained as an output;

an adder, operatively connected to said processor array means, for adding the output of said processor array means to an intermediate output of said adder stored as an intermediate value; and an intermediate storage unit, operatively connected to said adder, for storing the intermediate output of said adder as the intermediate value in an address thereof corresponding to a respective shift;

wherein the data sequence is input to the processor array means d times, the n/d coefficients set in said processors are varied to respective predetermined values each time the data sequence is input, and where n, d and n/d are integers;

wherein the reading of the intermediate value from said intermediate storage unit and the storing of the intermediate output supplied from said adder is delayed by n/d cycles each time, other than the first, the data sequence is input; and wherein after the input of the data sequence d times the intermediate output of said adder is the sum of products of the n coefficients and the data items.

2. A system as recited in claim 1, wherein the n coefficients correspond to a distribution curve.

3. A system as recited in claim 1, wherein said system further comprises control means for controlling the setting of the n/d coefficients in said processors, the shifting of the data items to produce the input data items, and the reading and storing of the intermediate outputs from and to said intermediate storage unit.

4. A system as recited in claim 3, wherein said processor array further comprises:

coefficient memory means for storing the n coefficients;

coefficient switching means for switching the n/d coefficients set in said processors; and summation means for summing the products of said processors to produce the outputs.

5. A system as recited in claim 4, wherein said control means controls the reading and storing of the intermediate outputs by providing a control signal, and wherein said system further comprises gate means for controlling the reading and storing of the intermediate outputs from and to said intermediate storage unit in accordance with the control signal.

6. A method for calculating a sum of products of n coefficients multiplied by data items of a data sequence using n/d processors, where n, d and n/d are integers, said method comprising the steps of:

(a) setting n/d of the n coefficients to the n/d processors;

(b) sequentially shifting the data items of the data sequence into each of the n/d processors;

(c) multiplying the data items and the coefficients respectively set, by said setting and said shifting of steps (b) and (a), to each of the n/d processors to produce first and second products;

(d) adding the first and second products to produce an intermediate output;

(e) storing the intermediate output;

(f) repeating steps (b) through (e) until the data sequence has been completely shifted;
(g) setting unprocessed coefficients of the n coefficients to the n/d processors; and
(h) repeating steps (b) through (g) d−1 times.

7. A method as recited in claim 6,
wherein said shifting of step (b) sequentially shifts the data sequence by one data item, and
wherein said setting of step (g) sets n/d of the unprocessed coefficients.

* * * * *

UNITED STATES PATENT AND TRADEMARK OFFICE
CERTIFICATE OF CORRECTION

PATENT NO. : 4,987,557
DATED      : January 22, 1991
INVENTOR(S): Muraoka

It is certified that error appears in the above-identified patent and that said Letters Patent is hereby corrected as shown below:

On the title page, item [54] and in column 1, lines 2 and 3, in the title, "OF SUM" should be --OF A SUM--.

IN THE DRAWING

"INTERMEDIATE STORAGE" should be --INTERMEDIATE STORAGE UNIT--.

Col. 1, Equation (1), "$k_{na}$" should be --$k_n a_n$--.

Col. 3, line 61, "This" should be --respectively equal to equations (1) and (3). This--.

Col. 5, line 8, "$a_i$, $a_i+_1$, $a_i+_2$, $a_i+_e$" should be --$a_i$, $a_{i+1}$, $a_{i+2}$, $a_{i+3}$--.

line 38, delete "4".
line 47, "$P_{1-i}z$" should be --$P_{1-2}$--.

Equation (9), "$P_1$" should be --$P_{1-i}$--.

Col. 6, Equation (12), (second line), "$k_3 + a_{i+2}$" should be --$k_3 a_{i+2}$--.

Signed and Sealed this

Twenty-eighth Day of July, 1992

*Attest:*

DOUGLAS B. COMER

*Attesting Officer*     *Acting Commissioner of Patents and Trademarks*